United States Patent
Wang et al.

(10) Patent No.: US 9,838,206 B2
(45) Date of Patent: Dec. 5, 2017

(54) NETWORK DEVICE AND METHOD OF PROCESSING DYING GASP

(71) Applicant: ACCTON TECHNOLOGY CORPORATION, Hsinchu (TW)

(72) Inventors: Shih-Hsien Wang, Tainan (TW); Keng-Shao Liu, Chiayi (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 481 days.

(21) Appl. No.: 14/063,055

(22) Filed: Oct. 25, 2013

(65) Prior Publication Data
US 2014/0143411 A1    May 22, 2014

(30) Foreign Application Priority Data
Nov. 22, 2012   (TW) .............................. 101143699 A

(51) Int. Cl.
*H04L 12/26* (2006.01)
*H04L 12/10* (2006.01)
*H04L 12/24* (2006.01)

(52) U.S. Cl.
CPC .......... *H04L 12/10* (2013.01); *H04L 41/0213* (2013.01)

(58) Field of Classification Search
CPC ... G08B 21/185; H04L 43/065; H04L 43/106; H04L 12/10; H04L 41/0233; H04L 41/0631; H04L 41/069; H04L 41/0213

USPC .................... 370/467, 657; 709/203, 224
See application file for complete search history.

(56) References Cited

U.S. PATENT DOCUMENTS

| | | | |
|---|---|---|---|
| 9,007,228 B2* | 4/2015 | Song, II | G08B 21/185 340/657 |
| 2004/0024865 A1* | 2/2004 | Huang | H04L 41/0604 709/224 |
| 2010/0057849 A1* | 3/2010 | Ji | H04L 41/0681 709/203 |
| 2010/0241907 A1* | 9/2010 | Nakamura | G06F 11/0709 714/43 |
| 2012/0126790 A1* | 5/2012 | Sobotka | G01D 4/002 324/119 |
| 2014/0009298 A1* | 1/2014 | Song, II | G08B 21/185 340/657 |

* cited by examiner

*Primary Examiner* — Noel Beharry
*Assistant Examiner* — Lionel Preval
(74) *Attorney, Agent, or Firm* — Lynette Wylie; Apex Jurls, pllc.

(57) ABSTRACT

A network device is provided, which is connected to a receiver. The network device includes a signal processing unit and a transceiver unit. Prior to occurrence of a hardware interrupt event, the signal processing unit detects the connection configuration between the network device and the receiver and outputs a temporary signal corresponding to the configuration of connection. The transceiver unit, which is connected to the signal processing unit and the receiver, receives and stores the temporary signal so that, when a hardware interrupt event occurs, the transceiver unit generates a dying gasp corresponding to the temporary signal and transmits the dying gasp to the receiver.

14 Claims, 3 Drawing Sheets

NETWORK DEVICE AND METHOD OF PROCESSING DYING GASP

The current application claims a foreign priority to the patent application of Taiwan No. 101143699 filed on Nov. 22, 2012.

BACKGROUND OF THE INVENTION

1. Technical Field

The present invention relates to a network device. More particularly, the present invention relates to a network device capable of transmitting a dying gasp and a method of processing the dying gasp processing thereof.

2. Description of Related Art

With the advancement of network communication technology, network devices such as network switches, routers and modems have become increasingly prevalent, allowing people to access various networks for more and more time. To ensure stability of their operation, the aforementioned network devices generate and transmit a dying gasp to each receiver connected thereto as soon as a hardware interrupt event (e.g., a power outage) takes place. The dying gasps of a network device are, in fact, notifications to the users or the manager that the power supply of the network device is malfunctioning or is about to shut down and hence requires troubleshooting. Each receiver receiving the dying gasp is also a network device, which is connected to the network device experiencing the hardware interrupt event.

Generally, a network device is powered by a built-in energy storage device (e.g., a capacitor) for a certain period of time when it is experiencing a hardware interrupt event to generate and transmit a dying gasp to each receiver in a timely manner. However, as the number of the receivers connected to a network device increases, the number of dying gasps that a network device has to generate and transmit to its receivers upon occurrence of a hardware interrupt event increases, too. As a result, the period of time for which a network device is allowed to be sustained by its built-in energy storage device must be extended, for example by using a larger energy storage device for providing more electric power. This larger energy storage device, however, goes against the trend toward network device miniaturization. Therefore, the conventional network devices and the way they generate and transmit dying gasps still leave something to be desired and need further improvement.

BRIEF SUMMARY OF THE INVENTION

In view of the above, the present invention provides a network device and a processing method of a dying gasp thereof which can substantially shorten the time required for transmitting the dying gasp to each corresponding receiver when a hardware interrupt event takes place, and which therefore allows the volume of the required energy storage device to be reduced.

The network device of the present invention is signal-connected to at least one receiver and includes a signal processing unit and a transceiver unit. Before a hardware interrupt event takes place, the signal processing unit detects the connection configuration between the network device and each receiver and outputs a temporary signal corresponding to each connection configuration detected. The transceiver unit is connected to the signal processing unit and serves to receive and store the at least one temporary signal.

The processing method of a dying gasp of the present invention includes the following steps to be performed before a hardware interrupt event occurs. To begin with, a signal processing unit detects the connection configuration with each of at least one receiver. Then, the signal processing unit outputs a temporary signal corresponding to the connection configuration with each receiver. The at least one temporary signal is received and stored by a transceiver unit.

As soon as a hardware interrupt event occurs, the transceiver unit generates a dying gasp corresponding to each temporary signal and transmits each dying gasp to the corresponding receiver.

The network device and the processing method of a dying gasp described above are so designed that the time required for transmitting a dying gasp to each corresponding receiver upon occurrence of a hardware interrupt event is significantly shortened. Consequently, the volume of the required energy storage device can be reduced to meet the design requirement of network device miniaturization.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
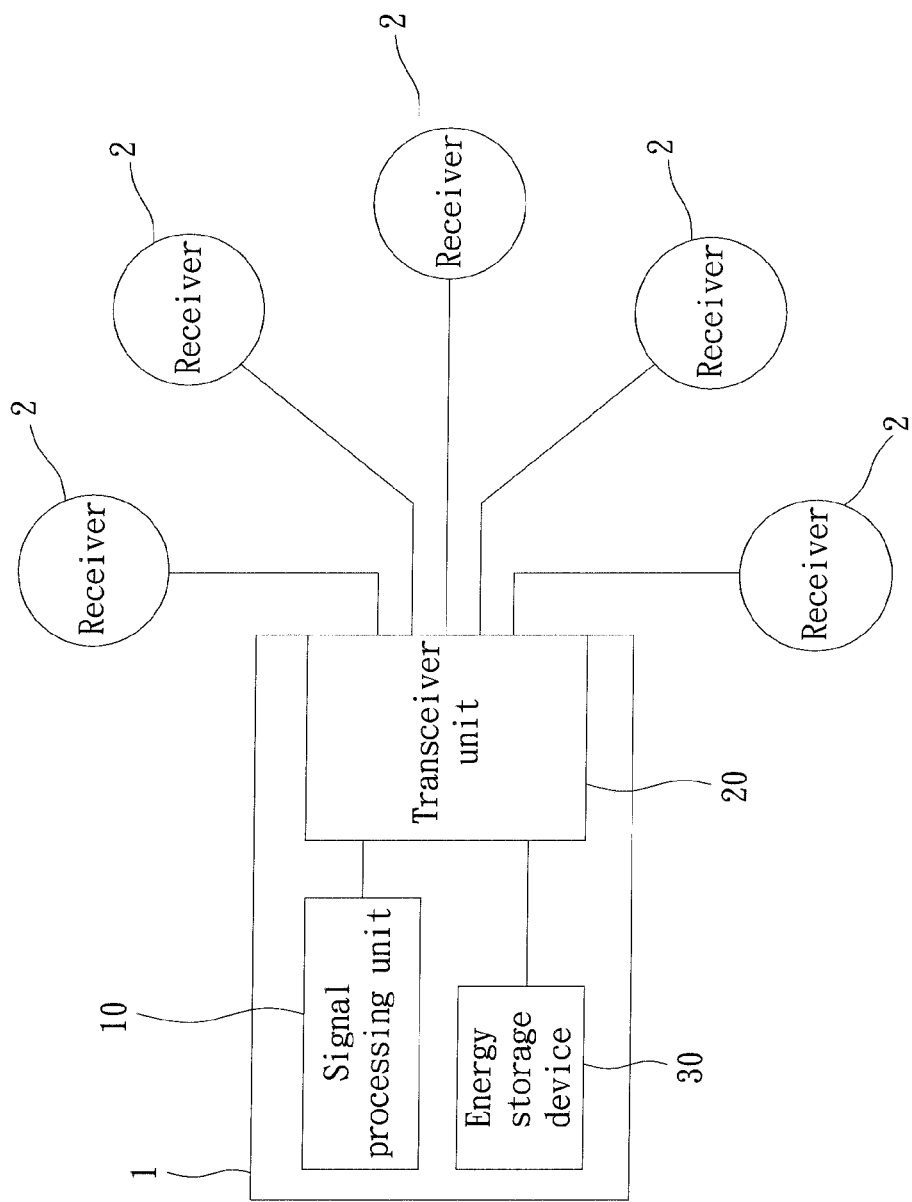
FIG. 1 is a block diagram of the network device according to an embodiment of the present invention.

Referring to FIG. 1, a network device 1 according to a preferred embodiment of the present invention is connected to a plurality of receivers 2. In an embodiment, the connection between the network device 1 and the receivers 2 is implemented via the Simple Network Management Protocol (SNMP). The receivers 2 are other network devices to which the network device 1 is connected, but the connection therebetween is not limited to the foregoing. The network device 1 essentially includes a signal processing unit 10 and a transceiver unit 20. The signal processing unit 10 is configured for processing signals between the network device 1 and the receivers 2. The signal processing unit 10 in this embodiment is a device having processing and computation capabilities as network connection control and determination. It may be, without limitation, a microcontroller or a network chip. The signal processing unit 10 detects a configuration of a connection between the network device 1 and each receiver 2 and generates a temporary signal corresponding to each configuration of the detected connection.

The transceiver unit 20 is connected to the signal processing unit 10 and each receiver 2, and is configured for receiving and storing the temporary signals generated by the signal processing unit 10. The transceiver unit 20 of the present invention is capable of controlling receiving and transmitting of data packets as well as storing the data packets. For example, the transceiver unit 20 may be a combination of a port and a register but is not limited thereto.

In an embodiment, the network device 1 further includes an energy storage device 30 electrically connected to the transceiver unit 20. When a hardware interrupt event takes place, the energy storage device 30 supplies electric power to the transceiver unit 20, so as for the transceiver unit 20 to generate a dying gasp corresponding to each temporary signal upon occurrence of the hardware interrupt event and transmit the dying gasp to the corresponding receiver 2 immediately.

In an embodiment, a hardware interrupt event may be an abnormal condition in power supply caused either by a power outage or by a malfunctioning component of the power source, but a hardware interrupt event is by no means limited to the above. To identify the occurrence of a hardware interrupt event, the signal processing unit 10 determines the current state of the power supply by means of specific pins and conditions. For example, when the voltage at a certain pin is lower than a preset threshold, it is determined that the network device 1 is experiencing an abnormality in the power supply. Alternatively, the occurrence of a hardware interrupt event can be identified by another unit or module in the network device 1 that is configured for power supply control. The present invention imposes no limitations in this regard.

The circuit design of the network device 1 and the processing method of a dying gasp to be described below can significantly shorten a time for the network device 1 to transmit a dying gasp to each corresponding receiver 2 when a hardware interrupt event takes place. This is because, prior to the occurrence of a hardware interrupt event, the network device 1 of the present invention is already in possession of the information and contents (i.e., the temporary signals) needed to generate the dying gasps, so when a hardware interrupt event does occur, there is no need to perform the steps of detection and determination of the dying gasp. In consequence, not only is the time required to generate and transmit the dying gasps to their respective receivers 2 substantially reduced, but also the required energy storage device can be downsized.

Figure 2:
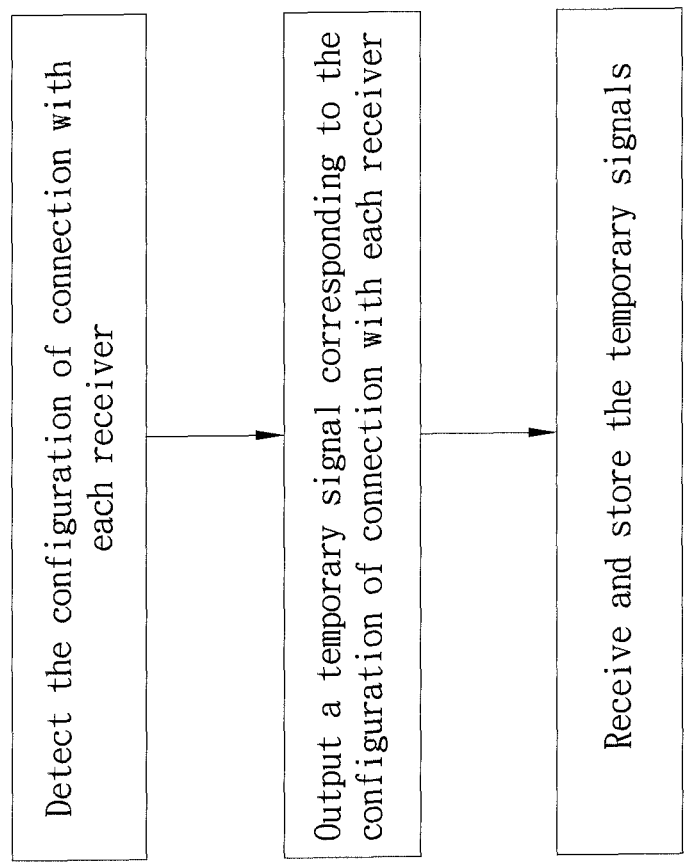
FIG. 2 is a flowchart of the processing method of a dying gasp according to the embodiment of the present invention.

Referring to FIG. 2, the processing method of a dying gasp includes the following steps to be performed before a hardware interrupt event takes place:

A. The signal processing unit 10 detects a connection configuration between the network device 1 and each receiver 2, wherein the configurations of the connections refer to the contents of the communication protocol by which the network device 1 is connected to each receiver 2 and the related settings of each receiver 2. In an embodiment, the communication protocol is the Simple Network Management Protocol version 1 (SNMPv1) or the Community-based SNMPv2 (SNMPv2c), but communication protocols applicable to the present invention are not limited to the foregoing. The related settings of each receiver 2 include the Internet Protocol (IP) address and the Media Access Control (Mac) address of each receiver 2, which addresses can be obtained through the Address Resolution Protocol (ARP). It is understood, however, that the related settings of each receiver 2 and their detection method are not limited to those stated above.

B. The signal processing unit 10 outputs a temporary signal corresponding to each configuration of the connection detected by the signal processing unit 10. Generally speaking, the contents of a dying gasp of the network device 1 vary with the contents of the communication protocol between the network device 1 and the corresponding receiver 2. For example, when the communication protocol between the network device 1 and a receiver 2 is SNMPv1, the contents of the corresponding dying gasp include request identifier (ID) information, time stamp information, and specific trap number information. When the communication protocol between the network device 1 and a receiver 2 is SNMPv2c, the contents of the corresponding dying gasp include request ID information, time stamp information, and information related to the last object ID (OID) of SNMP trap OIDs. In an embodiment, the signal processing unit 10 generates, according to the communication protocol with each receiver 2, information needed to compose the corresponding dying gasp as the corresponding temporary signal. Further, the communication protocol between the network device 1 and each receiver 2 can be individually set when the connection is established therebetween; hence, there is no need to worry that the network device 1 can use only one communication protocol. As for a network configuration, the related settings of each receiver 2 (e.g., the IP address and the Mac address of each receiver 2) not only are related to the processing of the corresponding temporary signal, but also determine the subsequent transmission target and path of the corresponding dying gasp. In addition, the related settings of each receiver 2 may serve as the basis on which the connection state of the receivers 2 (as explained in further detail below) and the corresponding signal comparison code (as explained in further detail below) are determined in subsequent steps.

C. The transceiver unit 20 receives and stores the temporary signals from the signal processing unit 10.

Thus, in anticipation of a hardware interrupt event taking place in the network device 1, the signal processing unit 10 prepares in advance the required information and contents for generating dying gasps, in the form of temporary signals. And because of that, the network device 1 does not have to perform again the steps of detection and determination of the dying gasp when a hardware interrupt event does occur. As a result, a time required to transmit dying gasps to the corresponding receivers 2 respectively upon an occurrence of a hardware interrupt event is significantly shortened, and the volume of the required energy storage device can therefore be reduced. When the network device 1 experiences a hardware interrupt event, the transceiver unit 20 directly generates the dying gasps respectively corresponding to the temporary signals and respectively transmits the dying gasps to the corresponding receivers 2 immediately.

It is noted that, in the present invention, the way of generating a dying gasp according to the corresponding temporary signal is not limited. As stated previously, the contents of a temporary signal may include information, such as the required ID information, depending on the communication protocol in use. With each temporary signal being the basic unit of the corresponding dying gasp, it is feasible to compose the entire contents of a dying gasp using the information of the corresponding temporary signal right in the first place. For example, in the course in which the signal processing unit 10 generates a temporary signal, the signal processing unit 10 composes and stores the temporary signal directly in the form of a dying gasp, so when a hardware interrupt event occurs, the transceiver unit 20 directly reads and transmits the temporary signal as a dying gasp. In this embodiment, therefore, the temporary signals generated by the signal processing unit 10 are dying gasps. Alternatively, in the course in which the signal processing unit 10 generates a temporary signal, the signal processing unit 10 stores the different parts of the information of the temporary signal separately according to the format of each part of the information or by other data processing methods (e.g., according to the address of the receiver 2 in question), and when a hardware interrupt event occurs, the transceiver unit 20 reads and assembles the different parts of the information of the temporary signal according to the aforesaid formats or conditions in order to generate the corresponding dying gasp to be transmitted. It is understood that applicable data reading and processing techniques are not limited to those described above.

Furthermore, step C is followed by a step of periodically performing steps A through C according to a predetermined time (e.g., at an interval of 5 minutes between each two consecutive repetitions), with a view to updating the contents of the existing temporary signals, wherein the predetermined time is set and controlled via the signal processing unit 10. Alternatively, after completion of step C, the signal processing unit 10 detects the connection state of the receivers 2 and updates the contents of the temporary signals accordingly, wherein the connection state refers to whether the number or states of the receivers 2 connected to the network device 1 are changed. For example, the connection state is changed when the network device 1 detects that the number of the receivers 2 connected thereto is increased or decreased. Here, a method for determining whether the number of the receivers 2 connected to the network device 1 is changed is similar to the aforesaid method for detecting the configurations of the connections. For example, when the IP address and the Mac address of a new device are detected, it is determined that an additional device is connected to the network device 1. By the same token, the disconnection of a device from the network device 1 will render the IP address and the Mac address of the former device undetectable. In either case, steps A to C will be performed again, provided that a change in the connection state is detected. The periodic or conditional updates ensure the information in the temporary signals is up-to-date.

Figure 3:
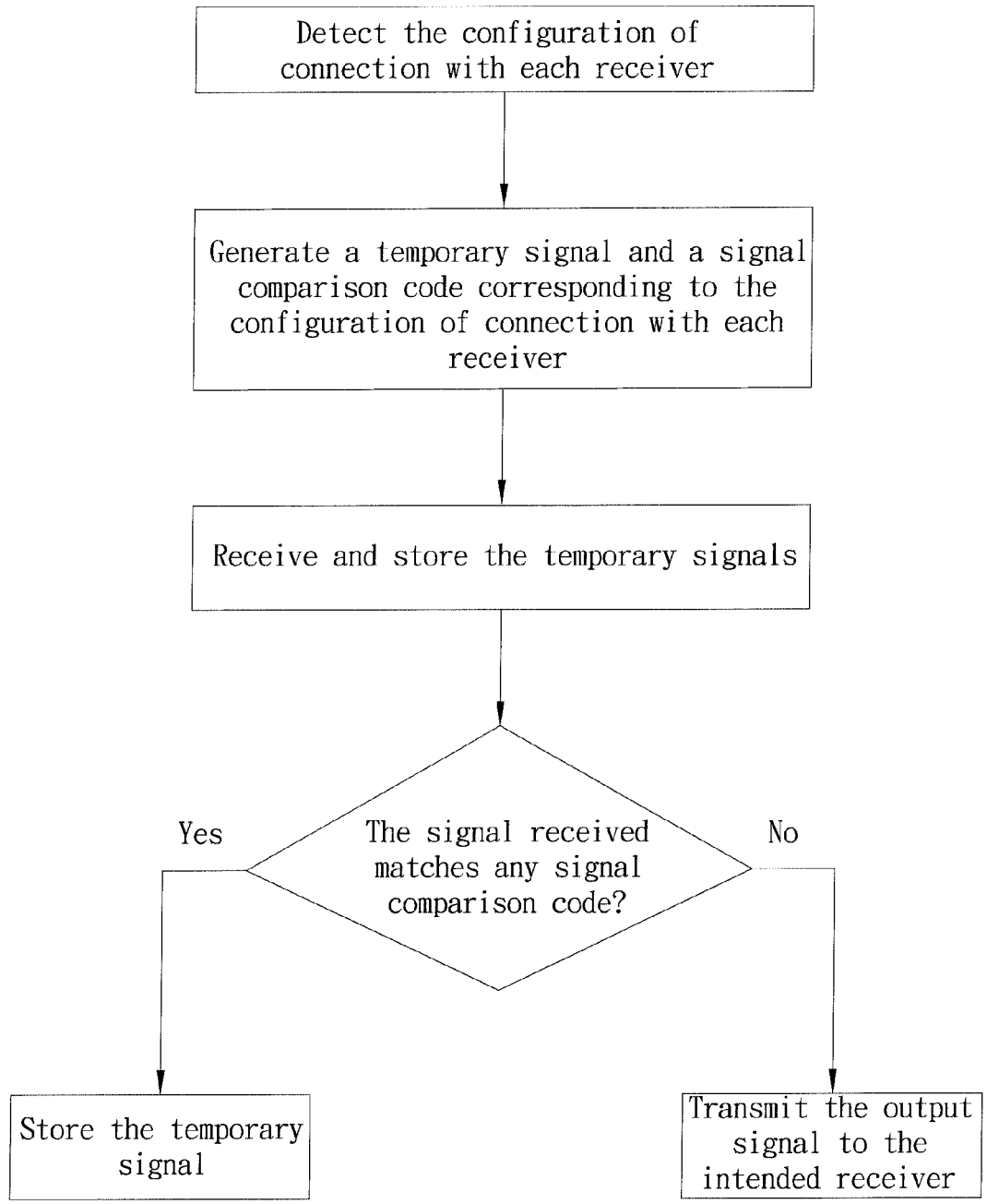
FIG. 3 is a flowchart of the processing method of a dying gasp according to another embodiment of the present invention.

It is noted that, generally speaking, a transmission of other types of signals (e.g., network packet signals, monitoring signals, etc.) also exists between the network device 1 and the receivers 2. Hence, in order to prevent a dying gasp from being mixed up with an output signal of another type, the following processing method of a dying gasp is derived from the aforesaid dying gasp processing method. Referring to FIG. 3, the derived processing method of a dying gasp includes the following steps to be performed prior to the occurrence of a hardware interrupt event:

A. The signal processing unit 10 detects the connection configuration between the network device 1 and each receiver 2. In an embodiment, the contents to be detected and the detection method are the same as those in the previous embodiment and therefore will not be described again. As stated above, signals of other types may also be transmitted between the network device 1 and the receivers 2, so the signal processing unit 10 in the present embodiment is configured to further generate at least one output signal to be transmitted to the receivers 2.

B. The signal processing unit 10 generates a signal comparison code, as well as a temporary signal, corresponding to each configuration of the detected connection. In an embodiment, each signal comparison code generated by the signal processing unit 10 corresponds to a temporary signal, and includes the dying gasp displacement information, the dying gasp length information, and the dying gasp content information corresponding to one of the receivers 2. The signal processing unit 10 transmits the signal comparison codes to the transceiver unit 20.

C. The transceiver unit 20 receives and stores the signal comparison codes from the signal processing unit 10. When the transceiver unit 20 subsequently receives a signal (it may be an output signal or a temporary signal) from the signal processing unit 10, the output signal or the temporary signal is compared with the signal comparison codes. If, after comparison, the signal matches one of the signal comparison codes, it means that the signal is a temporary signal, then the transceiver unit 20 stores the temporary signal. If the comparison result shows that the signal received does not match any of the signal comparison codes, it means that the signal is an output signal other than the temporary signal, then the transceiver unit 20 transmits the output signal to the intended receiver 2. In an embodiment, comparison with the signal comparison codes is to determine a match or mismatch with the dying gasp format (e.g., based on the dying gasp length information). In the course in which the signal processing unit 10 generates the temporary signal needed to compose a dying gasp, the signal processing unit 10 generates the corresponding information as the contents of the corresponding signal comparison code. Now that the way of generating the dying gasps according the corresponding temporary signals in the present invention is not necessarily limited, as stated above in relation to the previous embodiment, it is feasible in the present embodiment to compare a complete dying gasp with the signal comparison codes (e.g., in the course in which the signal processing unit 10 generates a temporary signal, the signal processing unit 10 composes and stores the temporary signal directly in the form of a dying gasp, and this dying gasp is subsequently compared with the signal comparison codes) or to compare individual contents of a temporary signal with the signal comparison codes. In an embodiment, the method and sequence of comparison are not limited to those described above.

It is noted that, in an embodiment, no limitations are imposed on the sequence of the at least one output signal and the temporary signals output by the signal processing unit 10 to the transceiver unit 20. As stated above, generation of the at least one output signal and generation of the temporary signals are not related in time or sequence. Therefore, it is feasible for the signal processing unit 10 to transmit the at least one output signal and the temporary signals separately or sequentially or simultaneously to the transceiver unit 20 for comparison and further processing. The sequence of transmission, however, is not limited to the foregoing.

In addition, step C may be followed by a step of performing steps A to C either periodically at a predetermined time interval between each two consecutive repetitions or when the connection state of the receivers 2 connected to the network device 1 is changed. This additional step ensures that information in the signal comparison codes and in the dying gasps is up-to-date, that the contents of the temporary signals are correct, and that the data transmission function can work properly. The technical contents of this additional step are the same as those stated in relation to the previous embodiment and therefore will not be repeated herein.

The circuit design of the network device 1 and the dying gasp processing methods described above not only significantly shorten the time required to transmit a dying gasp to the corresponding receiver 2, but also increase the speed at which each receiver 2 is notified, allowing the users or the manager to know in real time that the network device 1 is out of order and needs maintenance.

Besides, as the methods described above significantly shorten the time required to transmit dying gasps to their respective receivers 2, the time for which the network device 1 has to be powered by the energy storage device 30 in order to transmit the dying gasps is also substantially reduced. Hence, the object of transmitting dying gasps can be attained without using a large-volume or large-capacity energy storage device 30, and miniaturization of the network device 1 can be effectively achieved.

It must be pointed out that the embodiments described above are only some preferred embodiments of the present invention. All equivalent structures and manufacturing methods which employ the concepts disclosed in this specification and the appended claims should fall within the scope of the present invention.

What is claimed is:

1. A processing method of a dying gasp applied to a network device, the processing method prior to an occurrence of a hardware interrupt comprising the steps of:
    A. detecting a connection configuration between a network device and a receiver by a signal processing unit; and generating an output signal by the signal processing unit;
    B. generating a temporary signal corresponding to the connection configuration by the signal processing unit; and
    C. receiving and storing the temporary signal by a transceiver unit; transmitting the output signal and the temporary signal to the transceiver unit by the signal processing unit; and comparing the output signal and the temporary signal with a signal comparison code by the transceiver unit;
    wherein the connection configuration in the step A includes an Internet Protocol (IP) address and a Media Access Control (Mac) address of the receiver, and a communication protocol between the network device and the receiver;
    wherein the temporary signal in the step B includes at least one of request identifier (ID) information, time stamp information, specific trap number information, and information related a last object ID (OID) of Simple Network Management Protocol (SNMP) trap OIDs;
    the hardware interrupt is caused by a power outage in a power supply for the network device, or is caused when a voltage from the power supply is lower than a preset threshold;
    wherein the temporary signal is determined and stored for matching the signal comparison code; and the output signal is determined and transmitted to the receiver for not matching the signal comparison code.

2. The processing method of claim 1, further comprising the step of generating a dying gasp corresponding to the temporary signal and transmitting the dying gasp to the receiver when the hardware interrupt takes places.

3. The processing method of claim 1, further comprising the step of periodically repeating the step A to the step C according to a predetermined time interval.

4. The processing method of claim 1, further comprising the step of detecting a connection state of the receiver by the signal processing unit and, repeating the step A to the step C again when the connection state is changed.

5. The processing method of claim 1, wherein the Internet Protocol address and the Media Access Control address of the receiver are detected through an Address Resolution Protocol (ARP).

6. The processing method of claim 1, wherein the signal comparison code includes one of dying gasp displacement information, dying gasp length information, and dying gasp content information.

7. The processing method of claim 1, wherein the signal processing unit further generates the signal comparison code according to the connection configuration in the step B, and the signal processing unit further transmits the signal comparison code to the transceiver unit in the step C.

8. A network device, which is connected to at least one receiver, the network device comprising:
    a signal processing unit for, prior to an occurrence of a hardware interrupt, detecting a connection configuration between the network device and the receiver and generating a temporary signal corresponding to the connection configuration; and
    a transceiver unit connected to the receiver and the signal processing unit respectively and configured for receiving and storing the temporary signal;
    wherein the signal processing unit detects a connection state by inquiring an Internet Protocol (IP) address and a Media Access Control (Mac) address of the receiver and a communication protocol between the network device and the receiver;
    wherein the temporary signal includes at least one of request identifier (ID) information, time stamp information, specific trap number information, and information related to a last object ID (OID) of Simple Network Management Protocol (SNMP) trap OIDs;
    the hardware interrupt is caused by a power outage in a power supply for the network device, or is caused when a voltage from the power supply is lower than a preset threshold;
    wherein the signal processing unit further generates an output signal, and the transceiver unit further has a signal comparison code, wherein the transceiver unit compares signals from the signal processing unit with the signal comparison code; determines the signal as the temporary signal and stores the temporary signal in the transceiver unit, if the signal from the signal processing unit matches the signal comparison code; and determines the signal as the output signal and transmits the output signal to the receiver, if the signal from the signal processing unit does not match the signal comparison code.

9. The network device of claim 8, wherein, when the hardware interrupt occurs, the transceiver unit generates a dying gasp corresponding to the temporary signal and transmits the dying gasp to the receiver.

10. The network device of claim 8, wherein, a predetermined time interval after generating the temporary signal, the signal processing unit detects the connection configuration between the network device and the receiver again and updates the temporary signal according to the connection configuration.

11. The network device of claim 8, wherein the signal processing unit further detects a connection state of the receiver and, when the connection state changes, the signal processing unit detects the connection configuration between the network device and the receiver again and updates the temporary signal according to the connection configuration.

12. The network device of claim 8, wherein the Internet Protocol address and the Media Access Control address of the receiver are inquired through the Address Resolution Protocol (ARP).

13. The network device of claim 8, wherein the signal processing unit further generates the signal comparison code to the transceiver unit according to the connection configuration.

14. The network device of claim 8, wherein the signal comparison code includes at least one of dying gasp displacement information, dying gasp length information, and dying gasp content information.

\* \* \* \* \*